No. 672,560.
C. KUCHENBROD.
AXLE FASTENING.
(Application filed Jan. 21, 1901.)
(No Model.)
Patented Apr. 23, 1901.
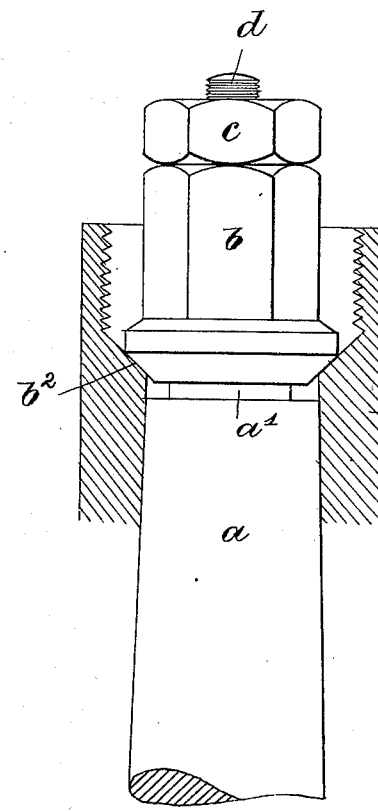
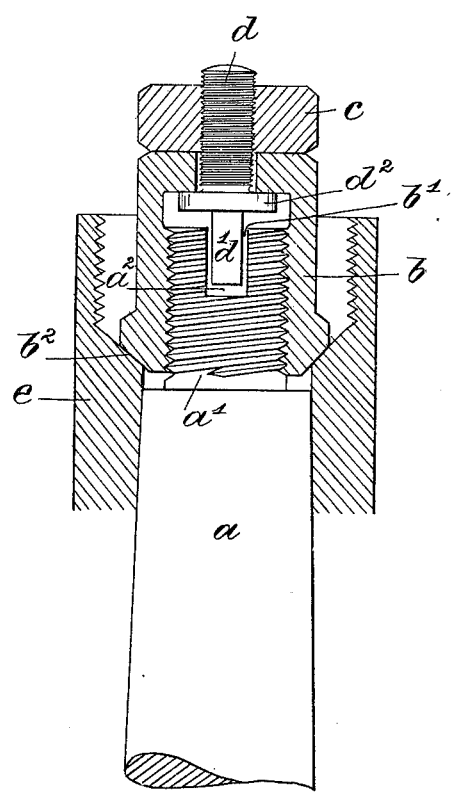
Witnesses:
H. C. Pinckney
Peter N. Ross
Inventor:
Clemens Kuchenbrod
By Edmond Cougar Brown,
Attorney.
THE NORRIS PETERS CO., PHOTO-LITHO., WASHINGTON, D. C.

UNITED STATES PATENT OFFICE.

CLEMENS KUCHENBROD, OF HATTERSHEIM, GERMANY, ASSIGNOR TO DICK & KIRSCHTEN, GESELLSCHAFT MIT BESCHRÄNKTER HAFTUNG, OF OFFENBACH-ON-THE-MAIN, GERMANY.

AXLE-FASTENING.

SPECIFICATION forming part of Letters Patent No. 672,560, dated April 23, 1901.

Application filed January 21, 1901. Serial No. 44,006. (No model.)

*To all whom it may concern:*

Be it known that I, CLEMENS KUCHENBROD, locksmith, residing at Lindlingerstrasse, Hattersheim, Germany, have invented new and useful Improvements in Safety Devices for Axle-Fastenings, (for which I have applied for Letters Patent in Germany, application K. 19,095/63$^C$, dated January 26, 1900, and application for useful model, K. 11,714/63, dated January 26, 1900,) of which the following is a specification.

The present invention relates to a safety device for axle-fastenings, the purpose of which is not only to prevent the said fastenings from opening independently, but also to provide means for counteracting even the slightest wear of the friction-surfaces of the axle-box and fastening-nut by tightening the latter, so that even the slightest lateral play of the axle is prevented—that is to say, the fastening can be adjusted to any desired point, and thereby prevented from opening independently.

In the annexed drawings, Figure 1 represents an elevation of the device, and Fig. 2 a longitudinal section thereof.

$a$ is the journal of the axle, at the end of which is a screw-threaded gudgeon $a'$. In the end of the said gudgeon $a'$ is a recess $a^2$ in the direction of the longitudinal axis of the former. This recess $a^2$ receives the prismatic or squared continuation $d'$ of the tie-bolt $d$, the screw-threaded part of which passes through the central opening $b'$ of the fastening-nut $b$. Between the threaded and the squared parts of the tie-bolt $d$ the latter is provided with a flange $d^2$. The tie-bolt $d$ is directly connected both with the axle and the fastening-nut, with the former by its squared part $d'$, which engages the recess in the gudgeon $a'$, and with the latter by the nut $c$, which is screwed upon the screw-threaded part of said tie-bolt.

The action of the safety device is as follows: When the axle-box $e$ has been placed upon the journal $a$ of the axle, the fastening-nut $b$, into which the tie-bolt $d$ has been first introduced, is first screwed on so far that the part $d'$ engages the gudgeon $a'$. This can easily be effected, if necessary, by turning the exterior end of the bolt $d$. Then the fastening-nut is screwed farther onto the gudgeon until it has reached the desired position with the axle-box $e$ on the inclined portion $b^2$ of the nut $b$, the tie-bolt $d$ bearing through its flange $d^2$ against the base of the fastening-nut and its end $d'$ entering further into the recess in $a'$. Thereupon the nut $c$ is screwed onto the projecting end of the tie-bolt $d$ until the flange $d^2$ is pressed tightly against the base of the fastening-nut $b$ and the nut $c$ presses firmly against the top of the fastening-nut, so that complete security is obtained, because none of this pressure bears upon the thread of said fastening-nut $b$ and the extension $d'$ prevents any rotation.

When the fastening is to be tightened, it is only necessary to loosen the nut $c$, tighten the nut $b$, and then secure the fastening again by means of the nut $c$.

Now what I claim, and desire to secure by Letters Patent, is the following:

1. In a safety device for axle-fastenings the combination with an axially-recessed gudgeon and a fastening-nut of a screw-threaded tie-bolt passing through an aperture of the said nut and having a continuation for entering the recess in the gudgeon and a nut fitting on the said screw-threaded tie-bolt and adapted to connect it tightly with the said fastening-nut substantially as described.

2. In a safety device for axle-fastenings the combination with an axially-recessed gudgeon and a fastening-nut of a screw-threaded tie-bolt having a flange and passing through an aperture of the said nut and having a continuation for entering the recess in the gudgeon and a nut fitting on the said screw-threaded tie-bolt and adapted to connect it tightly with the said fastening-nut substantially as described.

3. In a safety device for axle-fastenings the combination with an axially-recessed gudgeon, a fastening-nut and an axle-box of a screw-threaded tie-bolt passing through an aperture of the said nut and having a continuation for entering the recess in the gudgeon and a nut fitting on the said screw-threaded tie-bolt and adapted to connect it tightly with the said fastening-nut substantially as described.

In testimony whereof I have signed my name to this specification in the presence of two subscribing witnesses.

CLEMENS KUCHENBROD.

Witnesses:
MAX HENSEL,
JEAN GRUND.